United States Patent
Tai et al.

(10) Patent No.: US 9,589,178 B2
(45) Date of Patent: Mar. 7, 2017

(54) IMAGE PROCESSING WITH FACIAL FEATURES

(71) Applicant: HTC Corporation, Taoyuan County (TW)

(72) Inventors: Pol-Lin Tai, Taoyuan County (TW); Jing-Lung Wu, Taoyuan County (TW); Hsin-Ti Chueh, Taoyuan County (TW); Li-Cheng Chen, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 179 days.

(21) Appl. No.: 14/484,285

(22) Filed: Sep. 12, 2014

(65) Prior Publication Data
US 2016/0078280 A1   Mar. 17, 2016

(51) Int. Cl.
*G06K 9/00* (2006.01)
*G06T 13/80* (2011.01)
*G06K 9/46* (2006.01)

(52) U.S. Cl.
CPC ..... *G06K 9/00248* (2013.01); *G06K 9/00234* (2013.01); *G06K 9/00281* (2013.01); *G06K 9/00288* (2013.01); *G06K 9/4609* (2013.01); *G06T 13/80* (2013.01); *G06T 2210/44* (2013.01)

(58) Field of Classification Search
CPC ........... G06K 9/00248; G06K 9/00234; G06K 9/4609; G06K 9/00281; G06K 9/00288; G06T 13/80
See application file for complete search history.

(56) References Cited

U.S. PATENT DOCUMENTS

| | | | |
|---|---|---|---|
| 6,580,810 B1 | 6/2003 | Yang et al. | |
| 2007/0080967 A1 | 4/2007 | Miller | |
| 2007/0237421 A1 | 10/2007 | Luo et al. | |
| 2012/0154684 A1* | 6/2012 | Luo | G11B 27/034 348/700 |

FOREIGN PATENT DOCUMENTS

| | | |
|---|---|---|
| TW | 397948 B | 7/2000 |
| TW | 577028 B | 2/2004 |

OTHER PUBLICATIONS

Lee, Seung-Yong, Kyung-Yong Chwa, and Sung Yong Shin. "Image metamorphosis using snakes and free-form deformations." Proceedings of the 22nd annual conference on Computer graphics and interactive techniques. ACM, 1995.*

(Continued)

*Primary Examiner* — Bhavesh Mehta
*Assistant Examiner* — Menatoallah Youssef
(74) *Attorney, Agent, or Firm* — CKC & Partners Co., Ltd.

(57) ABSTRACT

An image processing method includes steps of: providing a source face image and a target face image; extracting facial features from the source face image and the target face image respectively; detecting feature dimensions of the facial features from the source face image and the target face image respectively; pairing the facial features from the source face image with the facial features from the target face image; and, forming an output face image by adjusting the facial features from the source face image in at least one of the feature dimensions according to the paired features from the target face image in the corresponding feature dimensions.

14 Claims, 9 Drawing Sheets

(56) References Cited

OTHER PUBLICATIONS

Steyvers, Mark. "Morphing techniques for manipulating face images." Behavior Research Methods, Instruments, & Computers 31.2 (1999): 359-369.*
Corresponding Taiwanese Office Action that these art references were cited on Dec. 10, 2015.
Fu Y et al: "M Face: An Appearance-Based Photorealistic Model for Multiple Facial Attributes Rendering", IEEE Transactions on Circuits and Systems for Video Technology, vol. 16, No. 7, Jul. 2006, pp. 830-842.
Kang S B: "A Survey of Image-based Rendering Techniques", Technical Report Series of Cambridge Research Laboratory, Aug. 1997, Retrieved from the Internet: URL: http://www.hpl.hp.com/techreports/Compaq-DEC/CRL-97-4.html [retrieved on Dec. 11, 2008].
Corresponding European Search Report mail on May 23, 2016.

* cited by examiner

IMAGE PROCESSING WITH FACIAL FEATURES

BACKGROUND

Field of Invention

The present application relates to an image processing method. More particularly, the present application relates to how to apply an image processing method for approaching a source image to a target image.

Description of Related Art

Recently, people get used to record their daily life by shooting photographs, and they can review the photographs in a digital album on their devices. After the photos are captured, some users may perform some post processes to the photographs, such as filtering, warping, and applying various parametric transformations.

Some photo-effect applications, focused on human faces, have been implemented, such as face warping effect, eye-fish effect, face smoothing effect, face-morphing effect, etc. The basic procedures of aforesaid photo-effect applications include manually selecting the desired effect(s), detecting face areas from the source and then applying image processing technologies on the specific face area. Users are required to manually select some effects and apply them onto specific area of the photo. Therefore, it takes a couple of minutes to revise one photo. If users tend to adjust the whole album, it may take minutes or even hours to apply aforesaid effects.

SUMMARY

An aspect of the present disclosure is to provide an image processing method. The image processing method includes steps of: providing a source face image and a target face image; extracting facial features from the source face image and the target face image respectively; generating feature dimensions according to the facial features from the source face image and the target face image respectively; pairing the facial features from the source face image with the facial features from the target face image; and, forming an output face image by adjusting the facial features from the source face image in at least one of the feature dimensions according to the paired features from the target face image in the corresponding feature dimensions.

According to an embodiment of the present disclosure, the facial features include facial feature points, color values or brightness values extracted from the source face image and the target face image.

According to an embodiment of the present disclosure, the feature dimensions include face boundaries, contours of facial areas, ratios or locations of facial areas, facial textures or color tones analyzed from the facial features of the source face image and the target face image.

According to an embodiment of the present disclosure, the source face image and the target face image are provided from different photo files or provided from different portions in the same photo file.

According to an embodiment of the present disclosure, the step of forming the output face image further includes: assigning a similarity strength between the output face image and the target face image; and adjusting the facial features of the source face image in all of the feature dimensions for approaching the paired features from the target face image in the corresponding feature dimensions according to the similarity strength.

According to an embodiment of the present disclosure, the step of forming the output face image further includes: assigning individual similarity strengths for each of the feature dimensions between the output face image and the target face image; and, separately adjusting the facial features of the source face image in each of the feature dimensions for approaching the paired features from the target face image in the corresponding feature dimensions according to the individual similarity strengths.

According to an embodiment of the present disclosure, the image processing method further includes a step of selecting a combination of the feature dimensions to be adjusted. While forming the output face image, the facial features in the combination of the feature dimensions are adjusted, and the facial features in any un-selected feature dimension remain the same as the source face image.

According to an embodiment of the present disclosure, the step of forming the output face image further includes a step of progressively forming a series of output face images under a series of progressive similarity strengths. Each of the output face images is formed by adjusting the facial features of the source face image for approaching the paired features from the target face image according to each of the progressive similarity strengths.

Another aspect of the present disclosure is to provide an electronic apparatus, which includes a storage unit and a processing unit. The storage unit is configured for storing a source face image and a target face image. The processing unit is configured for processing the source face image according to the target face image. The processing unit includes computer-executable instructions for performing a method. The method includes steps of: providing a source face image and a target face image; extracting facial features from the source face image and the target face image respectively; generating feature dimensions according to the facial features from the source face image and the target face image respectively; pairing the facial features from the source face image with the facial features from the target face image; and, forming an output face image by adjusting the facial features from the source face image in at least one of the feature dimensions according to the paired features from the target face image in the corresponding feature dimensions.

This disclosure presents an application for image processing method capable of modifying a source face image for approaching a target face image. In an embodiment, a source face image detected from an original photo is adjusted base on a preferable face model (e.g., a movie star, a celebrity, a person with a funny facial expression, etc) selected by the user, so as to create a beautiful/interesting photo including the target face image. Based on embodiments of the disclosure, the image processing method can be utilized to modify the source face image toward the preferable target face image in multiple feature dimensions, such as ratios, shapes, colors, textures and hair styles between two face images.

In addition, the source face image can be adjusted/changed/replaced progressively by different similarity strengths for approaching the preferable face model. Based on this disclosure, the user can modify the source face image in the original photo easily and automatically for approaching the target face image at different similarity results.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
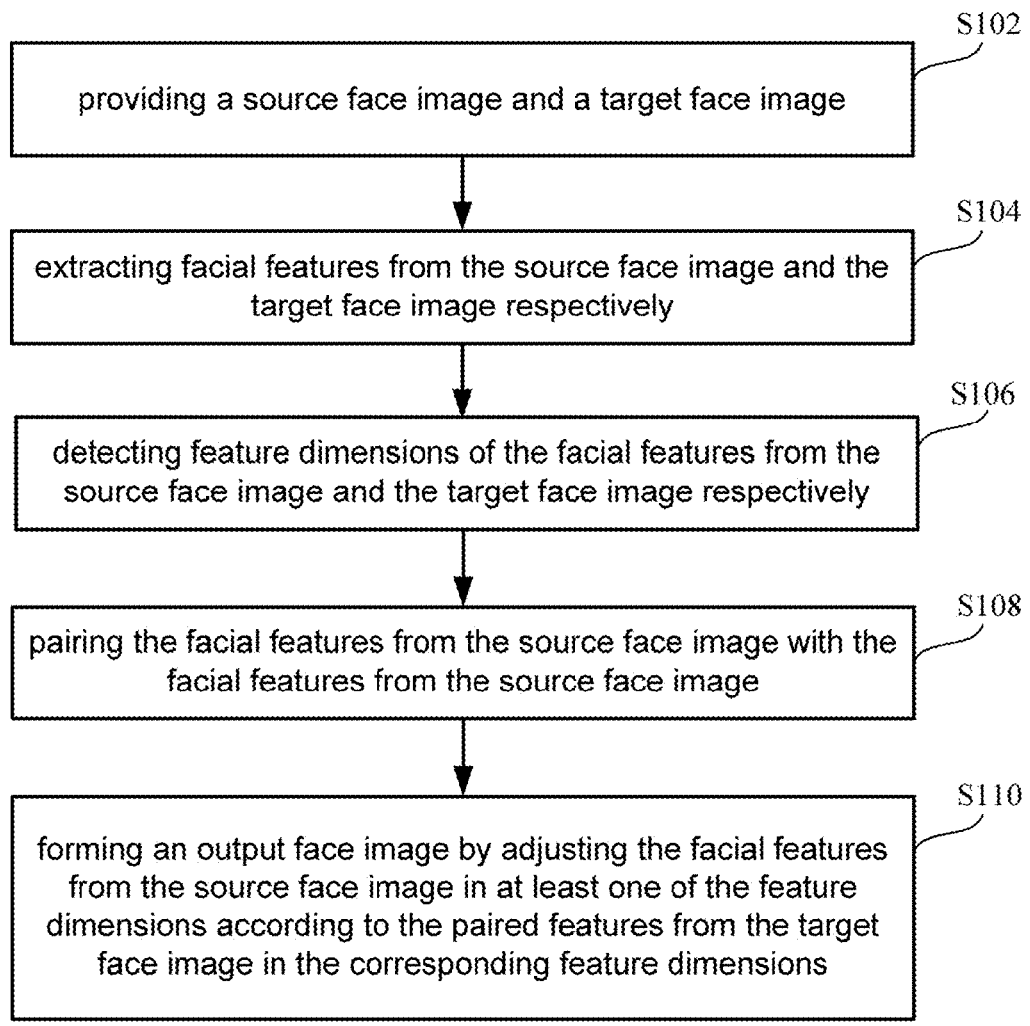
FIG. 1 is a flow chart diagram illustrating an image processing method according to an embodiment of the disclosure.

Reference is made to FIG. 1, which is a flow chart diagram illustrating an image processing method 100 according to an embodiment of the disclosure. The image processing method 100 can be utilized on a smartphone, a camera, a mobile phone with an image-sensing unit, a personal computer, an image processing system, etc.

As shown in FIG. 1, the image processing method 100 executes step S102 for providing a source face image and a target face image. In some embodiments, the source face image is a face area from an original photo, i.e., the photo file which the user wants to modify/adjust/beautify. The target face image is another face area from a preferable face model (e.g., from a movie star, a celebrity, a person with a funny facial expression or any person who the user wants to be, etc). The source face image and the target face image can be provided from different photo files, or provided from different portions in the same photo file.

For example, the source face image in the original photo can be detected and decided (according to predetermined setting or selection by the user) at first. Then, the target face image may comes from any source, such as a different person in the same photo, another person selected from predefined face templates, another person from download images, or even the same person in a different photo.

Figure 2A:
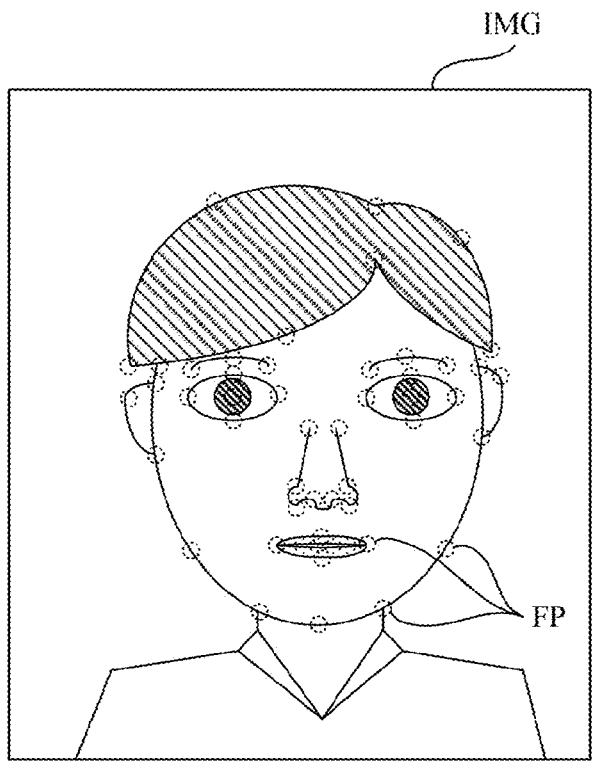
FIG. 2A is a schematic diagram illustrating a face image according to an embodiment of the disclosure.

Afterward, the image processing method 100 executes step S104 for extracting plural facial features from the source face image and the target face image respectively. Reference is also made to FIG. 2A. FIG. 2A is a schematic diagram illustrating a face image IMG (which can be the source face image or the target face image) according to an embodiment of the disclosure.

The face image IMG shown in FIG. 2A is an example for demonstrating the source face image or the target face image. Some facial features can be detected from the face image IMG (e.g., the source/target face image). In some embodiments, the facial features include facial feature points FP (e.g., turning points, endpoints, peaks, edges of objects as shown in FIG. 2A) within the source face image and the target face image. In addition, the facial features also include color values (e.g., R/G/B, Y/Cb/Cr, YUV, HSV values of pixels or any equivalent color-domain representations), brightness values, or texture/pattern extracted from the source face image and the target face image.

For brevity in explanation, FIG. 2A only show one of the source face image and the target face image, and it does not indicates the facial features are the same in the source face image and the target face image. In practical case, the source face image and the target face image will have their own facial features, which are normally different between the source face image and the target face image.

Afterward, the image processing method 100 executes step S106 for generating plural feature dimensions according to the facial features (e.g., the facial feature points FP shown in FIG. 2A, the color values, the brightness values, etc) from the source face image and the target face image respectively. In some embodiments, the feature dimensions can be face boundaries, contours of facial areas, ratios or locations of facial areas, facial textures or color tones analyzed from the facial features of the source face image and the target face image.

Figure 2B:
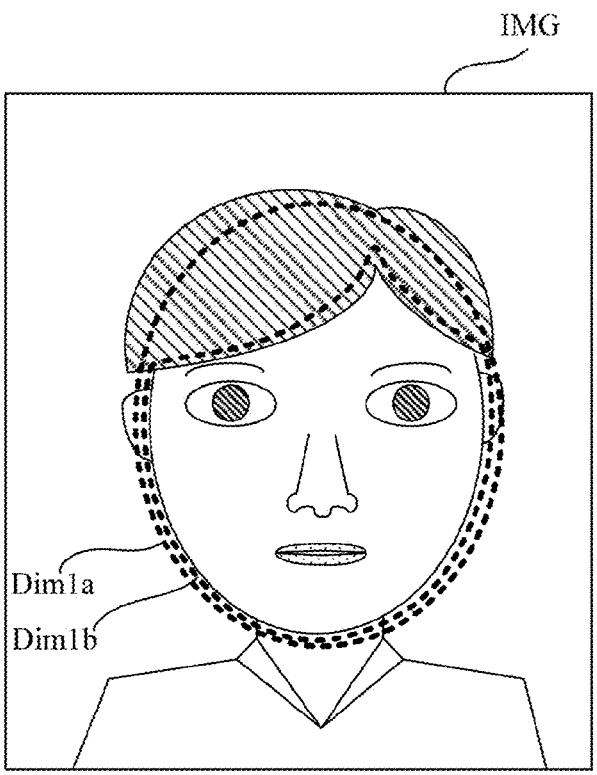
FIG. 2B to FIG. 2D are schematic diagrams illustrating feature dimensions generated according to the facial features of the face image in FIG. 2A.
Figure 2C:
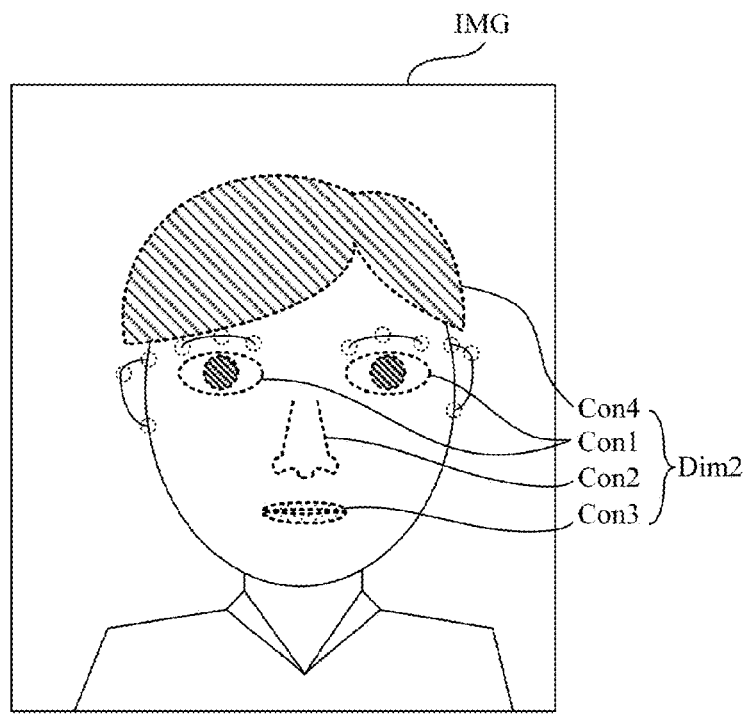
Figure 2D:
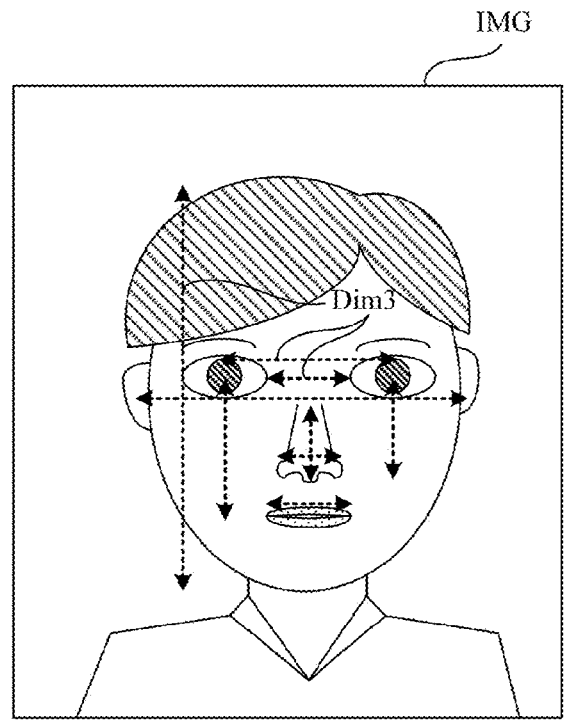

Reference is also made to FIG. 2B, FIG. 2C and FIG. 2D. FIG. 2B is a schematic diagram illustrating one feature dimension Dim1 detected from the face image IMG in FIG. 2A. FIG. 2C is a schematic diagram illustrating another feature dimension Dim2 detected from the face image IMG in FIG. 2A. FIG. 2D is a schematic diagram illustrating another feature dimension Dim3 detected from the face image IMG in FIG. 2A.

As shown in FIG. 2B, the feature dimension Dim1 generated from the face image IMG according to the facial features is a face boundary. The face boundary can be detected according to the distribution of the facial feature points FP shown in FIG. 2A. The facial feature points FP located on the bounder of the face are detected and analyzed for generating the feature dimension Dim1. The feature dimension Dim1 indicates the size and the location of the face of the source/target face image. In some embodiments, the feature dimension Dim1 is defined as the feature dimension Dim1*a* (including parts of the face and the hair) shown in FIG. 2B. In other embodiments, the feature dimension Dim1 is defined as the feature dimension Dim1*b* (including the face part without the hair part) shown in FIG. 2B, such that the face part and the hair part can be separated for applying different effects.

As shown in FIG. 2C, the feature dimension Dim2 generated from the face image IMG according to the facial features includes contours of facial areas, such as a contour Con1 of the eyes, another contour Con2 of the nose, another contour Con3 of the lips and another contour of the hairs. Aforesaid contours Con1, Con2, Con3 and Con4 can also be generated by analyzing the distribution of the facial feature points FP shown in FIG. 2A.

As shown in FIG. 2D, the feature dimension Dim3 generated from the face image IMG according to the facial features further includes ratios or locations of facial areas, such as a ratio between a gap between the eyes and a length of the nose, another ratio between the width of the lips and the width of the nose, locations of the eyebrows, etc. Aforesaid feature dimension Dim3 can also be generated by analyzing according to the distribution (including locations and relative distances) of the facial feature points FP shown in FIG. 2A.

The feature dimensions Dim1~Dim3 shown in FIG. 2B-2C are generated according to the distribution of the facial feature points FP shown in FIG. 2A. However, the feature dimensions in the disclosure are not limited thereto. In the embodiment, the feature dimensions further include facial textures (e.g., makeup, smoothness/roughness, skin, mole, etc) and color tones (e.g., dark, white, yellow, tan or light of skin colors, colors of cheeks, hair colors, etc). Therefore, the facial features extracted from the source face image and the target face image are analyzed into multiple feature dimensions.

Five feature dimensions (including face boundaries, contours of facial areas, ratios or locations of facial areas, facial textures and skin color tones) are utilized as an example of the disclosure. However, the image processing method 100 of the disclosure is not limited to this five feature dimensions, which can be replaced by other possible amount of feature dimensions. In some other embodiment, the image processing method can utilize N feature dimensions, and N is a positive integer larger than one.

In this embodiment, the relationships between the feature dimensions and facial features are not one-to-one mapping. Some feature dimensions can share and base on the same information of the facial features. For example, the feature dimensions Dim1~Dim3 (including face boundaries, contours of facial areas, ratios or locations of facial areas) are analyzed according to the distribution of the facial feature points FP. Other feature dimensions (including facial textures and skin color tones) are analyzed according to the color values, brightness values, or texture/pattern extracted from the source/target face image.

Afterward, the image processing method 100 executes step S108 for pairing the facial features from the source face image with the facial features from the target face image. For example, the facial feature points FP of the lips from the source face image are paired with corresponding facial feature points FP of the lips from the source face image; the facial feature points FP of the eyes from the source face image are paired with corresponding facial feature points FP of the eyes from the source face image. Therefore, the facial features from the source face image can be matched with the facial features from the target face image pair-by-pair.

Afterward, the image processing method 100 executes step S110 for forming an output face image by adjusting the facial features from the source face image in at least one of the feature dimensions according to the paired features from the target face image in the corresponding feature dimensions. Following paragraphs provides further embodiments and details of step S110 in FIG. 1.

In an embodiment, the adjustment in aforesaid step S110 can be applied on the whole source face image (including eyes, nose, month, skin, hair, makeup within the source face image) for approaching to the target face image. However, the disclosure is not limited thereto. In another embodiment, the user can assign some selected portions (e.g., eyes and month) in the source face image. The adjustment in aforesaid step S110 can be applied on the selected portions (including eyes and month) for approaching to corresponding portions of the target face image. In still another embodiment, the user can choose more than one target face image, and assign some selected portions (e.g., eyes and month) in the source face image for approaching to individual portions from different target face images. The adjustment in aforesaid step S110 can be applied on the selected portions for approaching to corresponding portions from different target face images.

Figure 3:
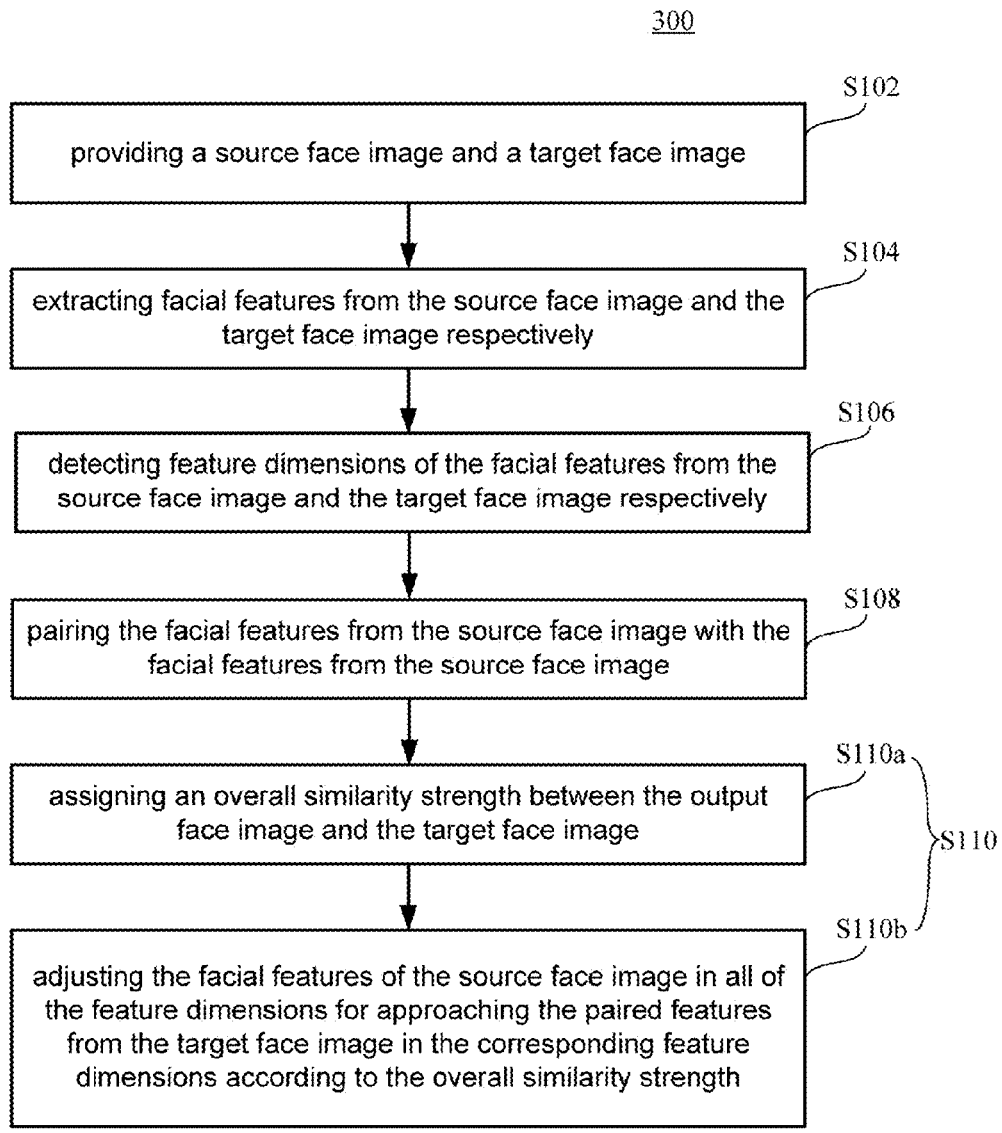
FIG. 3 is a flow chart diagram illustrating an image processing method according to an embodiment of the disclosure.
Figure 4A:
FIG. 4A is a schematic diagram illustrating an example of the source face image.
Figure 4B:
FIG. 4B is a schematic diagram illustrating an example of the target face image.
Figure 4C:
FIG. 4C is a schematic diagram illustrating an example of the output face image generated by the image processing method according to an embodiment.

Reference is made to FIG. 3, FIG. 4A, FIG. 4B and FIG. 4C. FIG. 3 is a flow chart diagram illustrating an image processing method 300 according to an embodiment of the disclosure. Steps S102 to S106 in the image processing method 300 are similar to the image processing method 100 in aforesaid embodiments. As shown in FIG. 3, the step S110 includes two sub-step S110a and sub-step S110b. FIG. 4A is a schematic diagram illustrating an example of the source face image IMGs. FIG. 4B is a schematic diagram illustrating an example of the target face image IMGt. FIG. 4C is a schematic diagram illustrating an example of the output face image IMGo generated by the image processing method 300 according to an embodiment.

In this embodiment, the source face image IMGs shown in FIG. 4A is from a selfie photo of the user, and the target face image IMGt is from a portrait photo of a famous model.

After the facial features from the source face image IMGs are paired with the facial features from the target face image in step S108. The image processing method 300 executes step S110a for assigning similarity strength between the output face image IMGo (to be formed) and the target face image IMGt. There is a gap between the source face image IMGs and the target face image IMGt. If the similarity strength is assigned to be strong, the output face image IMGo is formed to be more similar to the target face image IMGt and less similar to the source face image IMGs. On the other hand, if the similarity strength is assigned to be weak, the output face image IMGo is formed to be less similar to the target face image IMGt and more similar to the source face image IMGs.

Afterward, the image processing method 300 executes step S110b for adjusting the facial features of the source face image IMGs in all of the feature dimensions for approaching the paired features from the target face image IMGt in the corresponding feature dimensions according to the similarity strength. The adjustment on the source face image IMGs to from the output face image IMGo can be complete by a morphing algorithm. The similarity strength is a factor to decide a weight between the target face image IMGt and the source face image IMGs, while performing the morphing algorithm on the source face image IMGs.

As shown in FIG. 4C, the output face image IMGo is a result of adjusting the source face image IMGs in all of the feature dimensions (e.g., face boundaries, contours of facial areas, ratios or locations of facial areas, facial textures and color tones). It is noticeable that the hair style, the shapes of eyes and the nose, skin colors (and other facial features) of the output face image IMGo is changed from the source face image IMGs and becomes more similar to the target face image IMGt.

According to this embodiment, the user does not need to modify the source face image IMGs step-by-step for changing the hair style and shapes of the eyes, lighting up the skin and others. Once the target face image IMGt and the similarity strength are assigned, the output face image IMGo can be formed automatically for adjusting the source face image IMGs to approach the target face image IMGt.

In addition, the shape of the face (including eyes, nose, month or the whole face) can be adjusted manually in a traditional face-morphing effect. However, the traditional face-morphing effect does not involve the adjustments of facial textures and skin color tones. The image processing methods 100/300 are capable of beautifying the source face image IMGs in multiple feature dimensions (not only shapes but also colors, textures, ratios).

In aforesaid embodiment shown in FIG. 3 and FIG. 4C, the image processing method 300 utilized the similarity strength to adjust the source face image IMGs in all of the feature dimensions. However, the disclosure is not limited thereto. In another embodiment, the image processing method further include a step of selecting a combination (including one, two, three, or more of the feature dimensions) of the feature dimensions to be adjusted. While forming the output face image (step S110 as shown in FIG. 1 and FIG. 3), the facial features in the combination of the feature dimensions are adjusted, and the facial features in any un-selected feature dimension remain the same as the source face image.

Accordingly, the morphing algorithm for adjusting facial features could be applied to one of the multiple feature dimensions. For example, adjustments are only applied to the face boundary (or only applied to the eyes shape) and the other facial features remain the same.

In another embodiment, the morphing algorithm for adjusting facial features could be applied to any combination of multiple feature dimensions. For example, the morphing algorithm for adjusting facial features could be applied to color of pupil, shape of the mouth, ratios of each facial feature areas, color tones of the cheek and the hair color at the same time and the other facial features remain the same.

In aforesaid embodiments of FIG. 3, there is singular similarity strength assigned for all of the feature dimensions. However, the disclosure is not limited to this.

Figure 5:
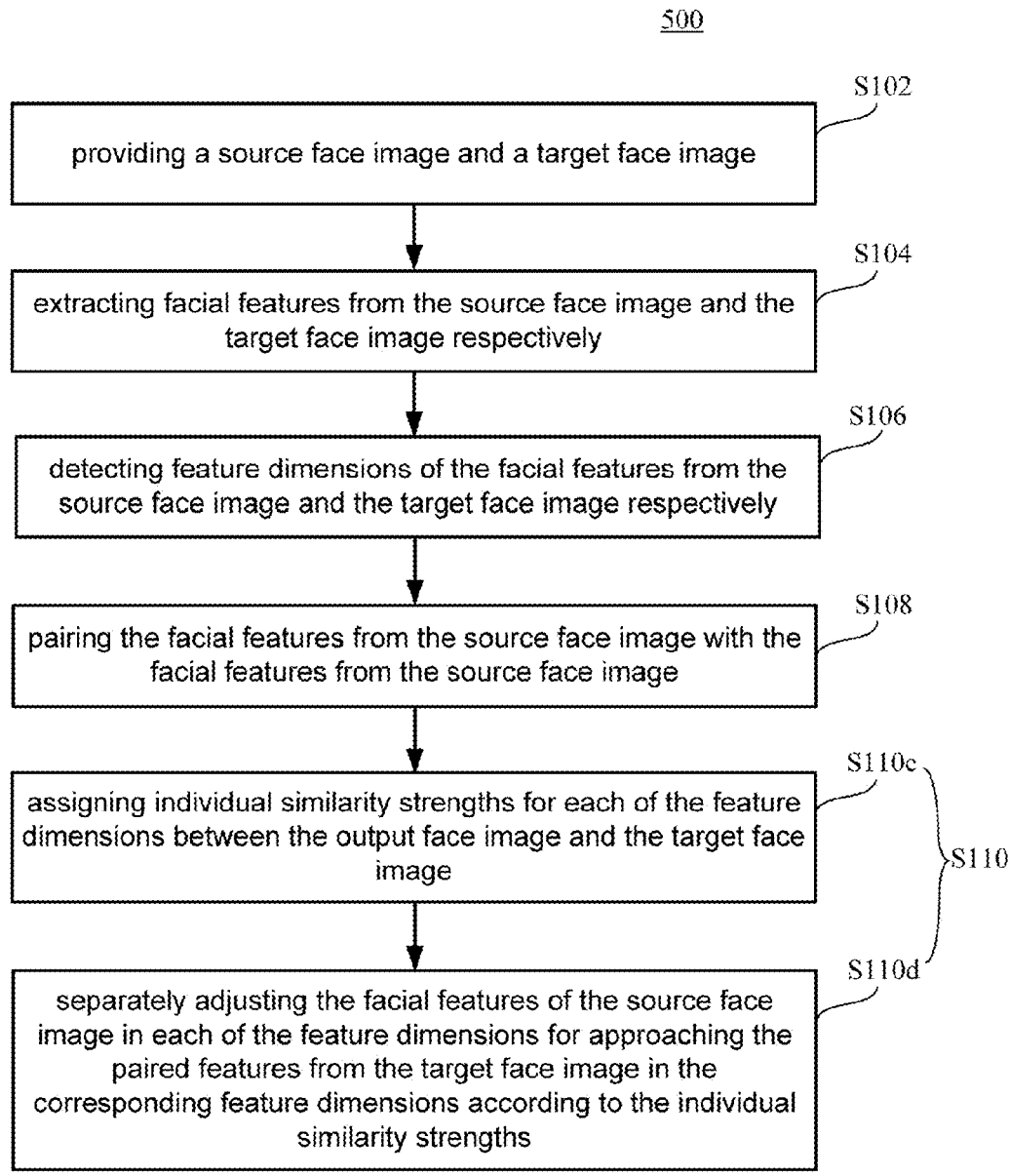
FIG. 5 is a flow chart diagram illustrating an image processing method according to an embodiment of the disclosure.
Figure 6:
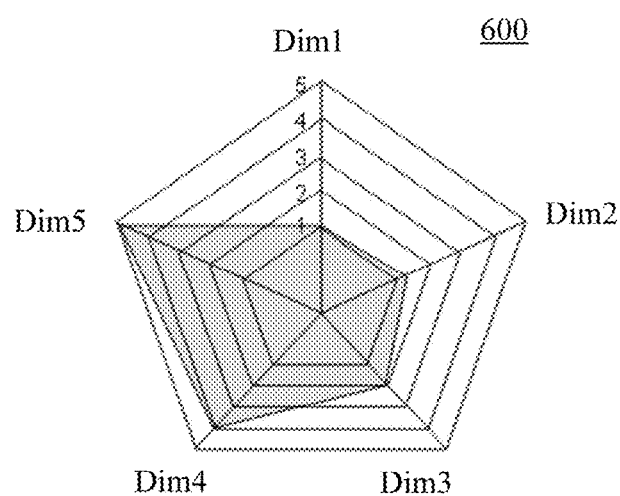
FIG. 6 is a schematic diagram illustrating an example of a user interface for assigning similarity strengths of the feature dimensions.

Reference is made to FIG. 5 and FIG. 6. FIG. 5 is a flow chart diagram illustrating an image processing method 500 according to an embodiment of the disclosure. Steps S102 to S106 in the image processing method 500 are similar to the image processing method 100 in aforesaid embodiments. As shown in FIG. 5, the step S110 includes two sub-step S110c and sub-step S110d. FIG. 6 is a schematic diagram illustrating an example of a user interface 600 for assigning similarity strengths of the feature dimensions.

As shown in FIG. 5, the sub-step S110c is performed for assigning individual similarity strengths for each of the feature dimensions between the output face image and the target face image. As shown in FIG. 6, the user interface 600 is utilized to assign five individual similarity strengths for five different feature dimensions Dim1~Dim5. In the example shown in FIG. 6, the individual similarity strength to the feature dimension Dim5 is set to be highest, and the individual similarity strength to the feature dimension Dim1 is set to be lowest.

Afterward, the sub-step S110d is performed for separately adjusting the facial features of the source face image in each of the feature dimensions for approaching the paired features from the target face image in the corresponding feature dimensions according to the individual similarity strengths. In the example shown in FIG. 6, the output face image is more similar to the target face image and less similar to the source face image in the feature dimension Dim5, and the output face image is less similar to the target face image and more similar to the source face image in the feature dimension Dim1.

Based on the embodiment of the image processing method 500 shown in FIG. 5, the user can freely tune the individual similarity strengths for each of the feature dimensions. For example, the hair style of the output face image can be set as more similar to the target face image, and in the meantime, the skin color of the output face image can be set as more similar to the source face image.

Figure 7:
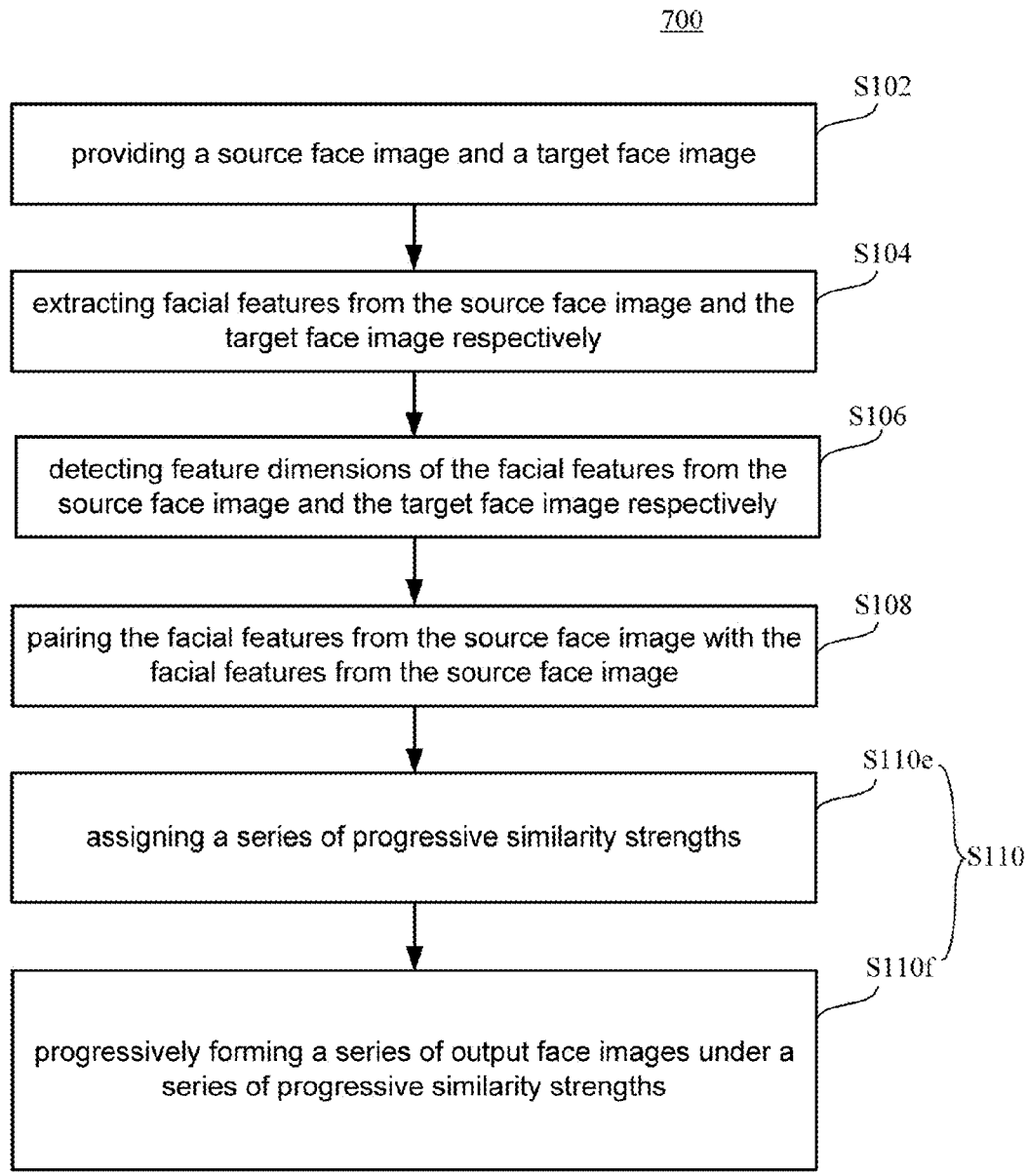
FIG. 7 is a flow chart diagram illustrating an image processing method according to an embodiment of the disclosure.
Figure 8:
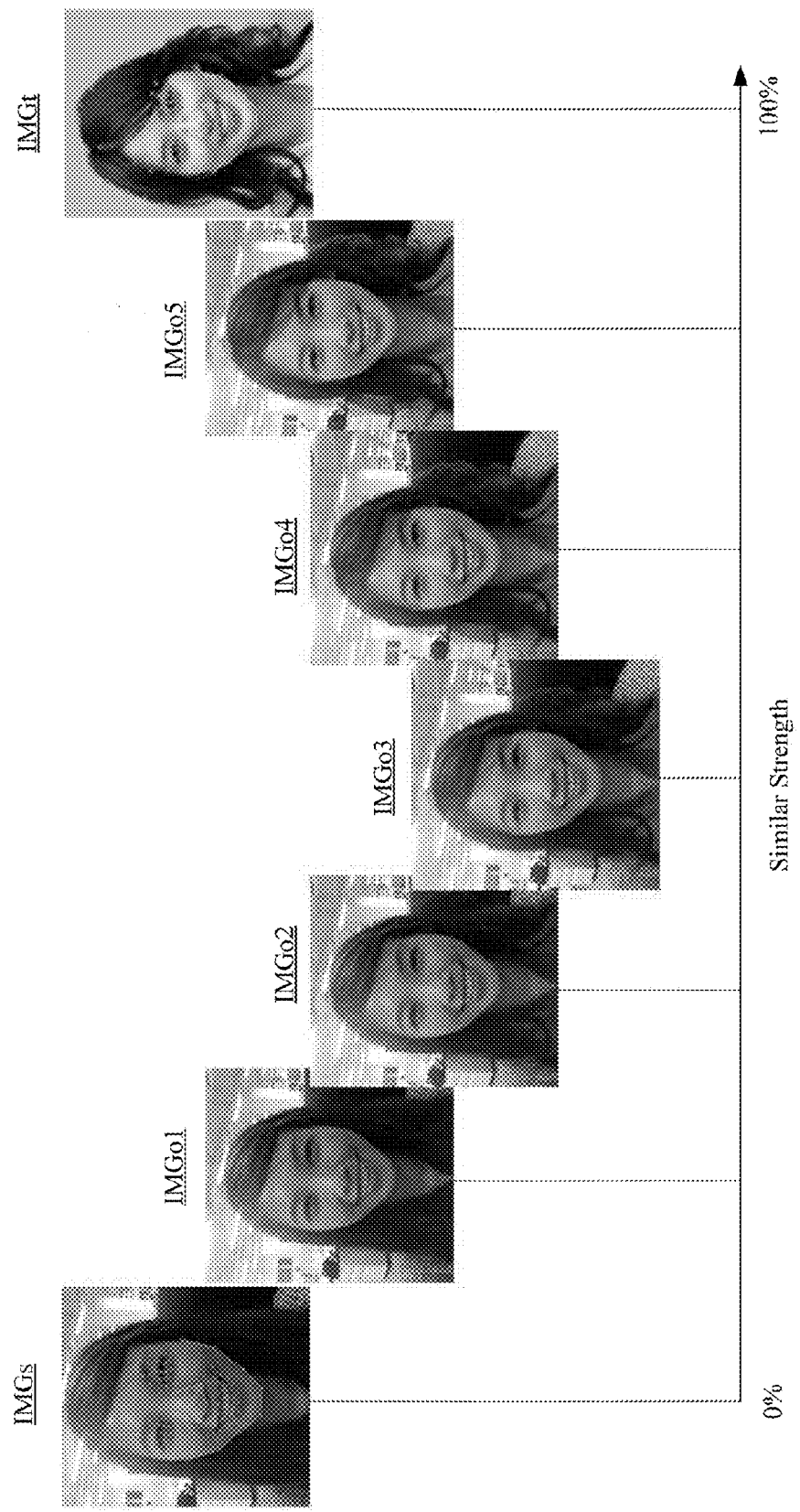
FIG. 8 is a schematic diagram illustrating an example of a series of output face images under a series of progressive similarity strengths according to the image processing method.

Reference is made to FIG. 7 and FIG. 8. FIG. 7 is a flow chart diagram illustrating an image processing method 700 according to an embodiment of the disclosure. Steps S102 to S106 in the image processing method 700 are similar to the image processing method 100 in aforesaid embodiments. As shown in FIG. 7, the step S110 includes two sub-step S110e and sub-step S110f. FIG. 8 is a schematic diagram illustrating an example of a series of output face images IMGo1~INGo5 under a series of progressive similarity strengths according to the image processing method 700 according to an embodiment.

As shown in FIG. 7, the sub-step S110e is performed for assigning a series of progressive similarity strengths between the output face image and the target face image. In the embodiment, the series of progressive similarity strengths are set respectively from low to high. The progressive similarity strengths are different from each others.

Afterward, the sub-step S110f is performed for progressively forming a series of output face images under a series of progressive similarity strengths. Each of the output face images is formed by adjusting the facial features of the source face image for approaching the paired features from the target face image according to each of the progressive similarity strengths. As shown in FIG. 8, the series of output face images include five output face images IMGo1~IMGo5. The output face image IMGo1 is less similar to the target face image IMGt and more similar to the source face image IMGs. The output face image IMGo5 is more similar to the target face image IMGt and less similar to the source face image IMGs. The output face images IMGo2~IMGo4 are shifted gradually between the output face image IMGo1 (most similar to the source face image IMGs) and the output face image IMGo5 (most similar to target face image IMGt).

According to the embodiment, the image processing method 700 can generate progressive face morphing result (the series of output face images IMGo1~IMGo5 under the progressive similarity strengths). The user can select one result from the series of output face images IMGo1~IMGo5 as the final outcome. In another embodiment, the output face images IMGo1~IMGo5 can be combined as an animation effect between the source face image IMGs and the target face image IMGt.

This disclosure presents an image processing method capable of modifying a source face image for approaching a target face image. In an embodiment, a source face image detected from an original photo is adjusted base on a preferable face model (e.g., a movie star, a celebrity, a person with a funny facial expression, etc) selected by the user, so as to create a beautiful/interesting photo including the target face image. Based on embodiments of the disclosure, the image processing method can be utilized to modify the source face image toward the preferable target face image in multiple feature dimensions, such as ratios, shapes, colors, textures and hair styles between two face images.

In addition, the source face image can be adjusted/changed/replaced progressively by different similarity strengths for approaching the preferable face model. Based on this disclosure, the user can modify the source face image in the original photo easily and automatically for approaching the target face image at different similarity results.

Another embodiment of the present disclosure is to provide an electronic apparatus, which includes a storage unit and a processing unit. The storage unit is configured for storing a source face image and a target face image. The processing unit is configured for processing the source face image according to the target face image. The processing unit includes computer-executable instructions for performing the image processing methods 100/300/500/700 disclosed in aforesaid embodiments. In some embodiments, the electronic apparatus further includes a user interface unit (e.g., a touch input panel, a mouse, a keyboard, etc) and a display unit. For example, the user interface unit can be configured for selecting the source face image and the target face image(s), assigning combination of the feature dimensions to be adjusted and/or assigning the similarity strength(s) disclosed in aforesaid embodiments. The display unit can be configured for displaying the output face image(s), such as the output face image IMGo shown in FIG. 4C or the output face images IMGo1~IMGo5 shown in FIG. 8 in aforesaid embodiments.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims.

What is claimed is:

1. An image processing method, comprising:
    providing a source face image and a target face image;
    extracting a plurality of facial features from the source face image and from the target face image respectively, the facial features comprising facial feature points, color values and brightness values extracted from the source face image and from the target face image respectively;
    generating a plurality of feature dimensions according to the facial features from the source face image and from the target face image respectively, the feature dimensions comprising face boundaries, facial textures and skin tones analyzed from the facial features;
    pairing the facial features from the source face image with the facial features from the target face image;
    selecting a combination of the feature dimensions to be adjusted; and
    forming an output face image by adjusting the facial features from the source face image in at least one of the feature dimensions according to the paired features from the target face image in the corresponding feature dimensions, wherein the facial features in the combination of the feature dimensions are adjusted, and the facial features in an un-selected feature dimension remain the same as the source face image.

2. The image processing method of claim 1, wherein the source face image and the target face image are provided from different photo files or provided from different portions in the same photo file.

3. The image processing method of claim 1, the step of forming the output face image further comprising:
    assigning a similarity strength between the output face image and the target face image; and
    adjusting the facial features of the source face image in all of the feature dimensions for approaching the paired features from the target face image in the corresponding feature dimensions according to the similarity strength.

4. The image processing method of claim 1, the step of forming the output face image further comprising:
    assigning a plurality of individual similarity strengths for each of the feature dimensions between the output face image and the target face image; and
    separately adjusting the facial features of the source face image in each of the feature dimensions for approaching the paired features from the target face image in the corresponding feature dimensions according to the individual similarity strengths.

5. The image processing method of claim 1, the step of forming the output face image further comprising:
    assigning a similarity strength between the output face image and the target face image; and
    adjusting the facial features of the source face image in all of the selected feature dimensions for approaching the paired features from the target face image in the corresponding feature dimensions according to the similarity strength.

6. The image processing method of claim 1, the step of forming the output face image further comprising:
    assigning a plurality of individual similarity strengths for each of the selected feature dimensions between the output face image and the target face image; and
    separately adjusting the facial features of the source face image in each of the feature dimensions for approaching the paired features from the target face image in the corresponding feature dimensions according to the individual similarity strengths.

7. The image processing method of claim 1, the step of forming the output face image further comprising:
    progressively forming a series of output face images under a series of progressive similarity strengths,
    wherein each of the output face images is formed by adjusting the facial features of the source face image for approaching the paired features from the target face image according to each of the progressive similarity strengths.

8. An electronic apparatus, comprising:
    a storage unit for storing a source face image and a target face image; and
    a processing unit, for processing the source face image according to the target face image, wherein the processing unit comprises computer-executable instructions for performing a method, comprising:
        extracting a plurality of facial features from the source face image and from the target face image respectively, the facial features comprising facial feature points, color values and brightness values extracted from the source face image and from the target face image respectively;
        generating a plurality of feature dimensions according to the facial features from the source face image and from the target face image respectively, the feature dimensions comprising face boundaries, facial textures and skin tones analyzed from the facial features;
        pairing the facial features from the source face image with the facial features from the target face image;
        selecting a combination of the feature dimensions to be adjusted; and
        forming an output face image by adjusting the facial features from the source face image in at least one of the feature dimensions according to the paired features from the target face image in the corresponding feature dimensions, wherein the facial features in the combination of the feature dimensions are adjusted, and the facial features in any un-selected feature dimension remain the same as the source face image.

9. The electronic apparatus of claim 8, wherein the source face image and the target face image are provided from different photo files or provided from different portions in the same photo file.

10. The electronic apparatus of claim 8, wherein the electronic apparatus further comprises a user interface unit, the step of forming the output face image further comprises:

assigning a similarity strength between the output face image and the target face image through the user interface unit; and adjusting the facial features of the source face image in all of the feature dimensions for approaching the paired features from the target face image in the corresponding feature dimensions according to the similarity strength.

11. The electronic apparatus of claim 8, wherein the electronic apparatus further comprises a user interface unit, the step of forming the output face image further comprises:

assigning a plurality of individual similarity strengths for each of the feature dimensions between the output face image and the target face image through the user interface unit; and separately adjusting the facial features of the source face image in each of the feature dimensions for approaching the paired features from the target face image in the corresponding feature dimensions according to the individual similarity strengths.

12. The electronic apparatus of claim 8, wherein the step of forming the output face image further comprises:

assigning a similarity strength between the output face image and the target face image through the user interface unit; and adjusting the facial features of the source face image in all of the selected feature dimensions for approaching the paired features from the target face image in the corresponding feature dimensions according to the similarity strength.

13. The electronic apparatus of claim 8, wherein the step of forming the output face image further comprises:

assigning a plurality of individual similarity strengths for each of the selected feature dimensions between the output face image and the target face image through the user interface unit; and separately adjusting the facial features of the source face image in each of the feature dimensions for approaching the paired features from the target face image in the corresponding feature dimensions according to the individual similarity strengths.

14. The electronic apparatus of claim 8, wherein the electronic apparatus further comprises a display unit, the step of forming the output face image further comprises:

progressively forming a series of output face images under a series of progressive similarity strengths, wherein each of the output face images is formed by adjusting the facial features of the source face image for approaching the paired features from the target face image according to each of the progressive similarity strengths, and the output face images are displayed on the display unit in sequence.

* * * * *